US007322579B2

(12) United States Patent
Riley

(10) Patent No.: US 7,322,579 B2
(45) Date of Patent: Jan. 29, 2008

(54) SPLINE SHAFT SEAL ASSEMBLY

(75) Inventor: William M. Riley, Warren, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 34 days.

(21) Appl. No.: 11/006,450

(22) Filed: Dec. 7, 2004

(65) Prior Publication Data

US 2006/0119047 A1    Jun. 8, 2006

(51) Int. Cl.
*F16J 15/34* (2006.01)
(52) U.S. Cl. ........................................ 277/372; 277/912
(58) Field of Classification Search ............... 277/911, 277/912, 394, 397, 372, 373; 464/162, 175, 464/173
See application file for complete search history.

(56) References Cited

U.S. PATENT DOCUMENTS

| | | | |
|---|---|---|---|
| 1,536,986 A | 5/1925 | Thiemer | |
| 3,197,213 A * | 7/1965 | Taylor | ........................ 369/223 |
| 3,197,216 A | 7/1965 | Jackson | |
| 3,913,924 A * | 10/1975 | Barefoot et al. | ............ 277/574 |
| 4,131,375 A | 12/1978 | Fisher | |
| 4,153,260 A * | 5/1979 | Joyner | ......................... 277/500 |
| 4,215,869 A * | 8/1980 | Pendleton | .................... 277/345 |
| 4,669,737 A * | 6/1987 | Diffenderfer | ................ 277/551 |
| 5,195,757 A * | 3/1993 | Dahll, V | ..................... 277/559 |
| 5,458,344 A * | 10/1995 | Weiler et al. | ................ 277/634 |
| 6,193,612 B1 | 2/2001 | Craig et al. | |
| 6,279,221 B1 | 8/2001 | Glowacki et al. | |
| 6,527,644 B2 | 3/2003 | Glowacki et al. | |
| 6,705,949 B2 | 3/2004 | Glowacki et al. | |
| 6,739,976 B2 * | 5/2004 | Glowacki et al. | ........... 464/175 |
| 2005/0054452 A1 * | 3/2005 | Wang et al. | ................ 464/173 |

* cited by examiner

*Primary Examiner*—Patricia Engle
*Assistant Examiner*—Gilbert Lee
(74) *Attorney, Agent, or Firm*—MacMillan Sobanski & Todd, LLC

(57) ABSTRACT

The present invention relates to seals and, in particular, to a seal that retains lubrication between the interface of a spline shaft and a sleeve shaft, which move relative to each other. The seal body has a flexible body with an axis and alternating projections and recesses aligned with the axis. A wiper element on at least one of the rows of projections and alternating recesses includes a tapered surface extending away from the axis, and an engagement face substantially perpendicular to the axis and adjoining the tapered surface.

17 Claims, 6 Drawing Sheets

SPLINE SHAFT SEAL ASSEMBLY

BACKGROUND OF THE INVENTION

The present invention relates to seals and, in particular, to a seal that retains lubrication between the interface of a spline shaft and a sleeve shaft, which move relative to each other.

The interface between a spline shaft and a sleeve shaft, such as on a driveshaft or propshaft, is typically sealed by a molded boot that is coupled to each shaft. The boot includes flexible joints or ribs that allow expansion and contraction of the boot as the shafts move relative to each other along an axis. One problem with these boots is that they typically require a relatively large volume of space around and along the shafts to provide boots that are capable of extending and compressing as required by the shafts. The large volume of space around the boot ensures that components of the vehicle do not contact or damage the boot during operation of the vehicle.

One problem with these boots is that they can easily be damaged. Another problem is that due to the amount of flex required by the boots, stress cracks may occur, especially as the boot ages. Any damage or cracks may result in dirt and other debris entering the boot, or leakage of lubricant from the boot. Dirt or debris in the boot, or loss of lubricant decreases the durability and life span of the sliding interface between the shafts. Due to the size of the boot, in some applications, the boot may be located in close proximity to high temperature components, and therefore require the use of expensive engineered plastics.

To address the above problems, some manufacturers use more compact seals that function as a dynamic seal. While these seal designs alleviate many problems associated with the molded boot, other problems are created, such as longevity of the seal in retaining lubricant in the interface between the shafts as well as preventing dirt, debris, and other materials from entering the interface between the shafts. These compact seals are typically formed from an elastomeric material and the constant relative movement of the seal against the spline shaft may cause the seal to break down over time.

Another problem with compact seals is obtaining the proper fit of the projections of the seal within grooves on the spline shaft. More specifically, if the engagement between the seal and spline shaft is too tight, the projections will quickly wear. Alternatively, if the engagement is too loose, the projections may have difficultly in wiping dirt and debris free of grooves and ribs on the spline shaft and difficulty in retaining lubricant within the interface.

SUMMARY OF THE INVENTION

The present invention relates to seals and, in particular, to a seal that retains lubrication between the interface of a spline shaft and a sleeve shaft, which move relative to each other. In a first embodiment, the present invention is directed to a seal body having a flexible body with an axis and alternating projections and recesses aligned with the axis. A wiper element on at least one of the rows of projections and alternating recesses includes a tapered surface extending away from the axis, and an engagement face substantially perpendicular to the axis and adjoining the tapered surface.

In a second embodiment, the present invention is directed to a slip spline seal assembly including a spline shaft having rows of alternating longitudinal grooves and ribs, and a seal body engaging the spline shaft and including a flexible body having rows of alternating projections and recesses for sealing engagement with the grooves and ribs of the spline shaft. A wiper element on at least one of the alternating projections and recesses of the seal body includes an engagement face engaging one of the rows of alternating grooves and ribs.

In a third embodiment, the present invention is directed to a spline seal assembly comprising a stiffening ring, a flexible body overmolded on the stiffening ring, wherein the flexible body includes an inner surface having a first profile of projections and alternating recesses. The assembly further includes an axis, wherein the stiffening ring includes an inner ring extending toward the axis. The inner ring defines support passages for coupling the flexible body to the stiffening ring.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
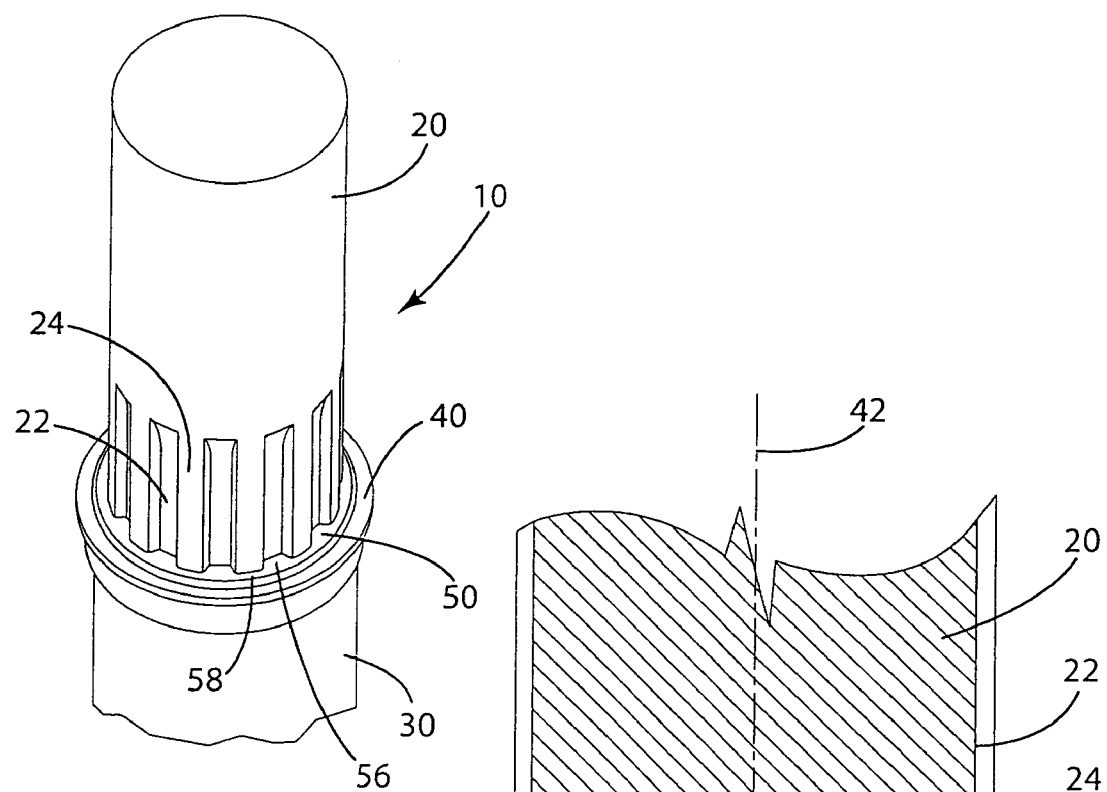
FIG. 1 is a perspective view of the slip spline seal assembly.
Figure 2:
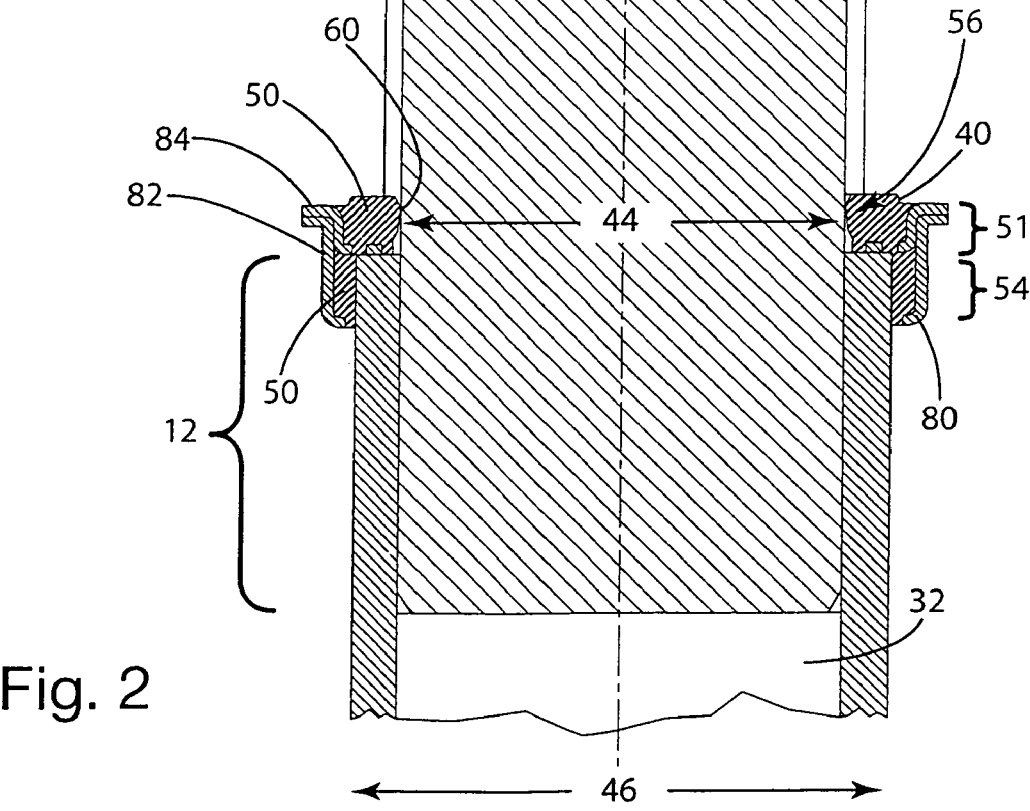
FIG. 2 is a sectional view of the slip spline seal assembly.

A slip spline seal assembly 10 is shown in FIG. 1. The slip spline seal assembly 10 includes a spline shaft 20 partially disposed within a sleeve shaft 30 and a seal body 40 coupled to the sleeve shaft 30 to retain lubrication between the interface 12 of the sleeve shaft 30 and the spline shaft 20 (FIG. 2). The seal body 40 also prevents dirt and other debris, that potentially reduce the performance of the slidable joint between the spline shaft 20 and sleeve shaft 30, from entering the interface 12.

The spline shaft 20 includes rows of alternating grooves 22 and ribs 24 (FIG. 1). The grooves 22 and ribs 24 fit within a matching profile on the sleeve shaft 30 to transfer torque between the shafts 20, 30, while allowing relative longitudinal movement of the shafts 20, 30 along the axis 42. The ribs 24 and grooves 22 may be formed in various sizes and shapes as desired. In the illustrated embodiment, the ribs 24 are substantially rectangular in cross-section and, due to the cylindrical shape of the spline shaft 20, the grooves 22 are somewhat trapezoidal (FIG. 1). Of course, the ribs 24 and grooves 22 may be formed in a variety of shapes.

The seal body 40 generally includes a flexible body 50 and a stiffening ring 80. The seal body 40 is retained on the sleeve shaft 30 so that the axes of the shafts 20, 30 and the seal body are aligned.

The flexible body 50 includes a base portion 54, a mounting surface 52, and a seal portion 51. As illustrated in FIG. 2, the mounting surface 52 is part of the base portion 54 and has an inner diameter that is approximately the same as the outer diameter 46 of the sleeve shaft 30. The mounting surface 52 slips over the sleeve shaft 30 and the seal body 40 is securely mounted to the sleeve shaft 30, such as by interference fit or press fit. Therefore, as the shafts 20, 30 move relative to each other, the seal body 40 remains stationary relative to the sleeve shaft 30, and moves relative to the spline shaft 20.

Figure 3:
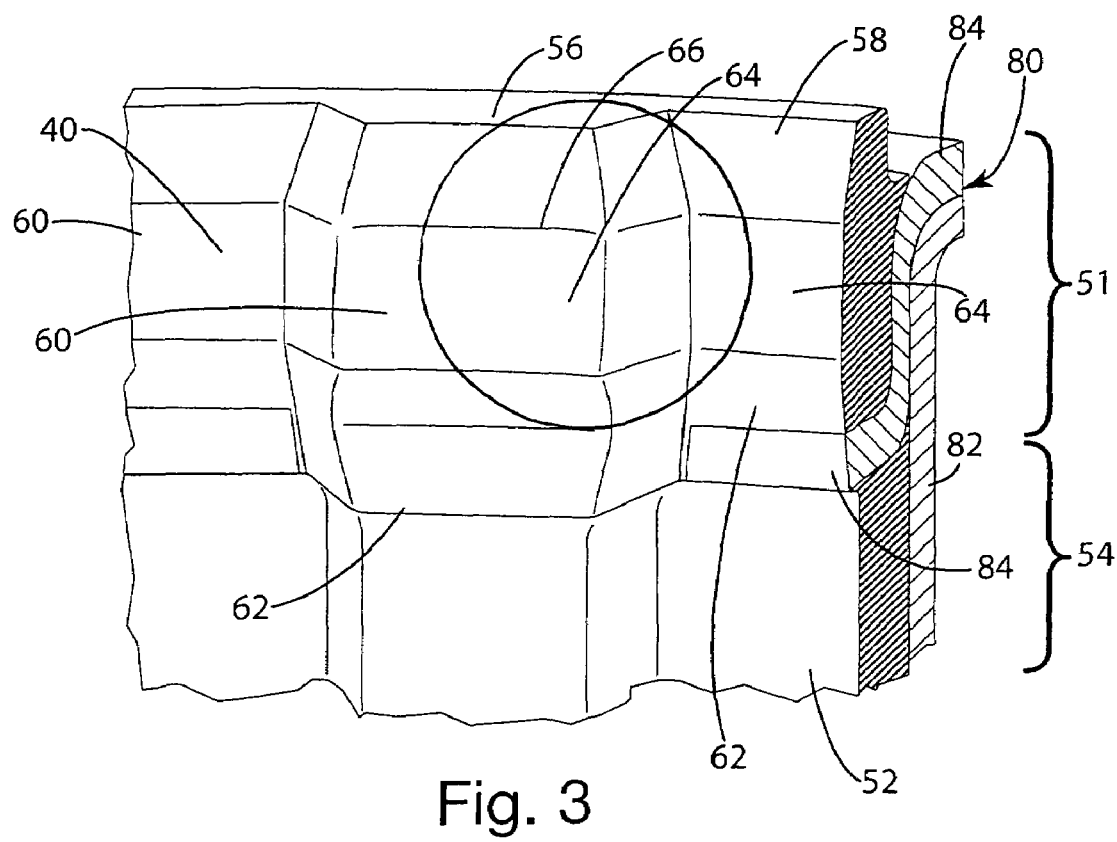
FIG. 3 is a perspective view of a portion of the flexible body.
Figure 4:
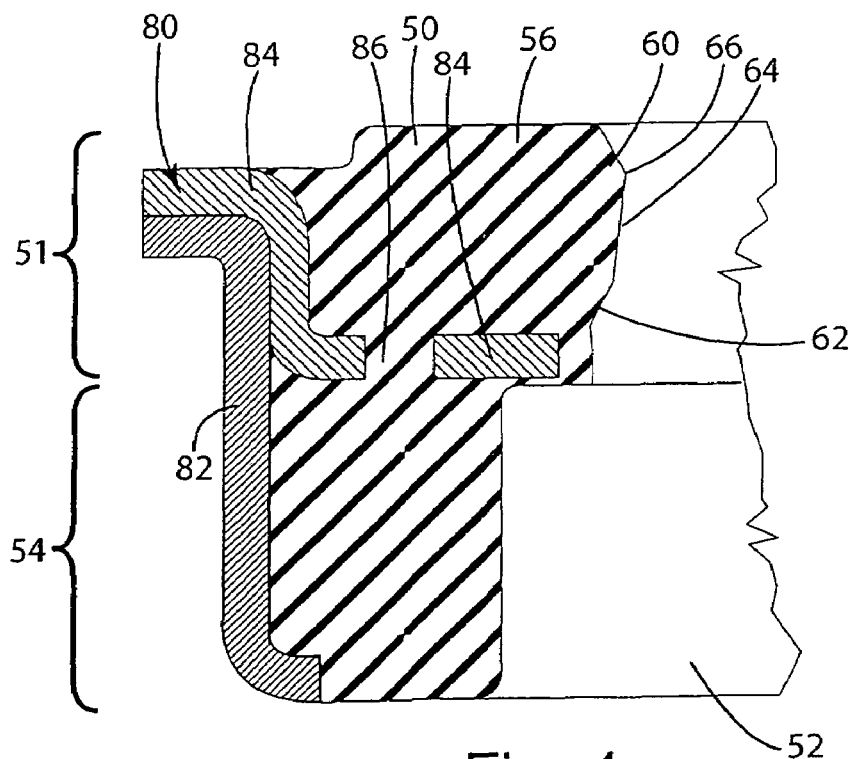
FIG. 4 is a sectional view of the seal body through the projections.
Figure 3A:
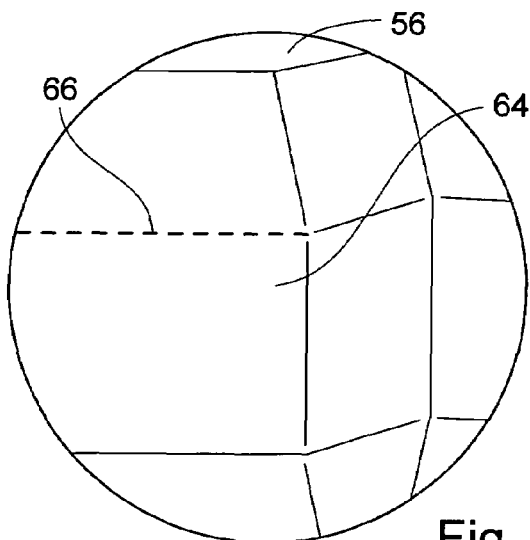
FIG. 3a is an enlarged view of the encircled portion in FIG. 3 illustrating a beaded lip.
Figure 3B:
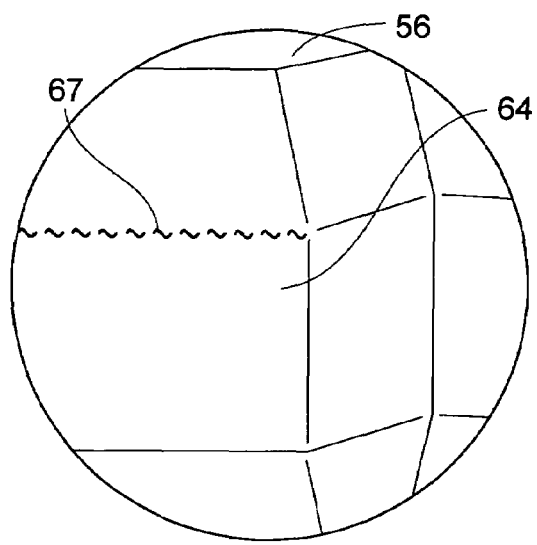
FIG. 3b is an enlarged view of the encircled portion in FIG. 3 illustrating a textured surface.
Figure 3C:
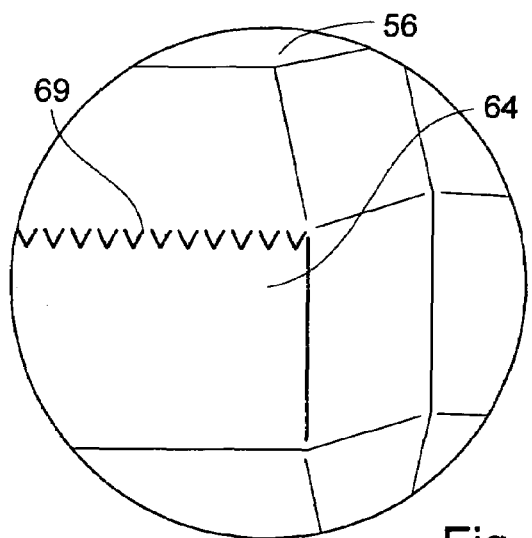
FIG. 3c is an enlarged view of the encircled portion in FIG. 3 illustrating the textured surface.
Figure 5:
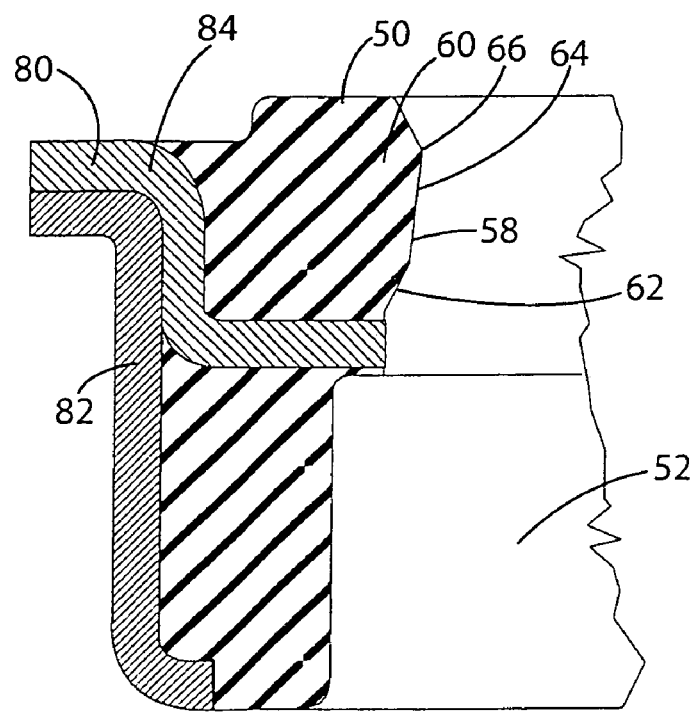
FIG. 5 is a sectional view of the seal body through the recesses.
Figure 6:
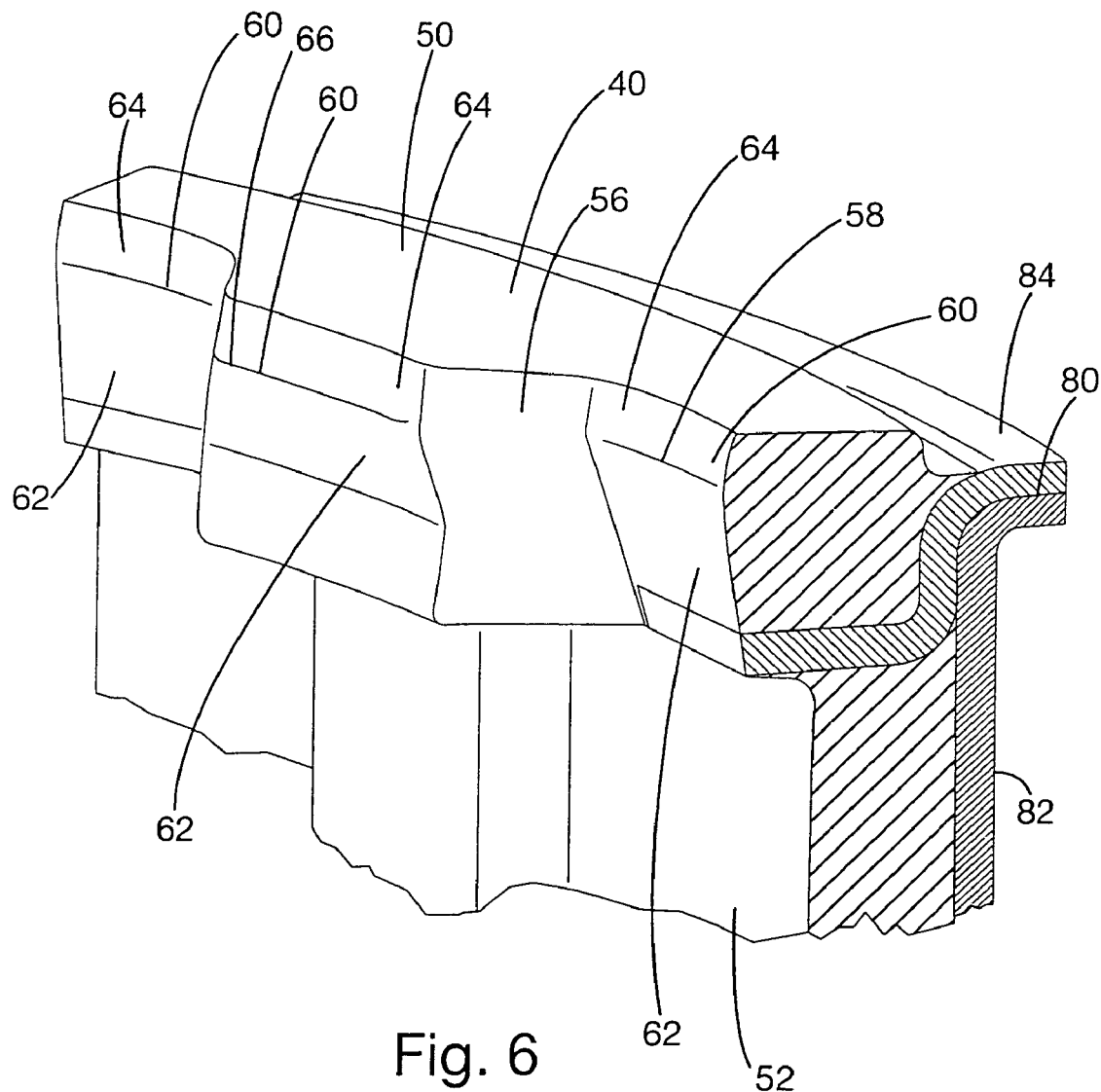
FIG. 6 is a perspective view of an alternative flexible body.

The seal portion 51 generally includes a first profile having circumferentially inward directed rows of alternating projections 56, and recesses 58 for splining engagement with the grooves 22 and ribs 24, respectively, on the spline shaft 20 (FIGS. 1-3 and 6). The seal portion 51 further includes a wiper element 60 arranged generally on at least one of the projections 56 or recesses 58. In the illustrated embodiment, the wiper element 60 seals to each of the projections 56 and recesses 58 (FIGS. 2, 3 and 6). The wiper element 60 generally includes an engagement face 64 and a tapered face 62 aligned with and extending toward the base portion 54. The engagement face 64 may be formed in a variety of sizes, shapes, and configurations, but in the illustrated embodiment FIGS. 3-5 includes a beaded lip 66 (FIG. 3). FIG. 3a illustrates an enlarged view of the encircled portion in FIG. 3 illustrating the beaded lip 66. The beaded lip 66 may also include a textured surface, such as small lateral ribs 67 as shown in FIG. 3b, or a scored surface 69 as shown in FIG. 3c, to further improve sealing capabilities against the spline shaft 20. The width of the beaded lip 66 may vary from an elongated angled point as shown in FIG. 3 to a wider lip as shown in FIG. 6. The seal portion 51 generally has an inner diameter 44, between projections 56 what is approximately the same as the outer diameter of the spline shaft 20, between the grooves 22.

The engagement face 64 is configured to allow sufficient compression against the spline shaft 20 to both seal the seal portion 51 to the spline shaft, as well as minimize wear on the seal portion 51. More specifically, the tapered face 62 is configured to allow the elastomeric material of the wiper element 60, specifically the engagement face 64, to compress as needed to prevent excessive wear while providing sufficient sealing characteristics. More specifically, the tapered face 62, illustrated as a bevel, provides an outlet for the compressed elastomeric material. As the engagement face is compressed, the tapered face 62 expands providing an outlet for the compressed elastomeric material. Therefore, the force between engagement face 64 and spline shaft 20 is controlled, especially as the spline shaft 20 moves relative to the engagement face 64. Of course, other shapes that provide compression relief to the engagement face may be used. The tapered face 62 combined with the engagement face 64 allows a tight seal between the spline shaft 20 while preventing resistance to slipping and preventing excessive wear and tear.

The flexible body 50 is generally formed from a resilient material such as vulcanized elastomers or TPE class materials. As shown in FIGS. 3 and 6, the location of the engagement face 64 may vary between embodiments.

Figure 7:
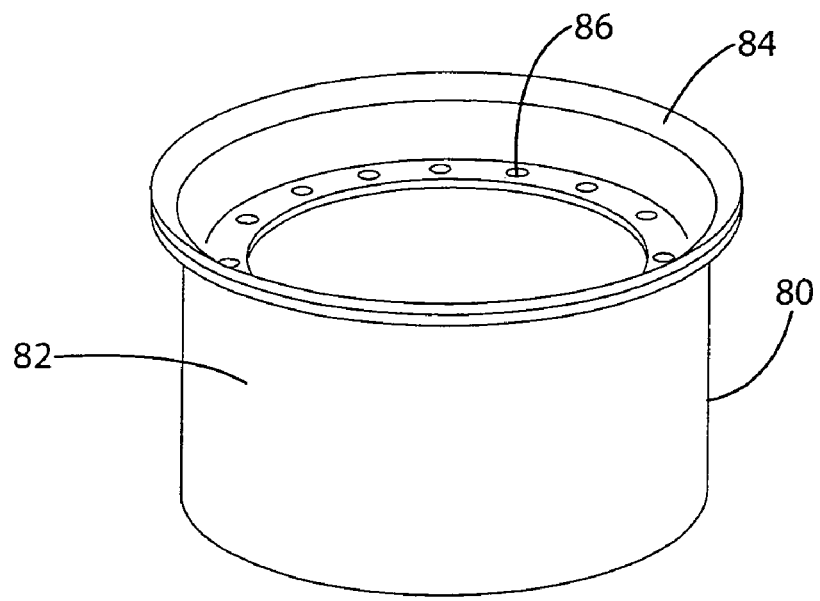
FIG. 7 is a perspective view of the stiffening ring.

The seal body 40 also includes the stiffening ring 80, around which the flexible body 50 is overmolded. In the illustrated embodiment, the passages 86 ensure retention of the flexible body 50 on the stiffening ring 80 as the shafts 20, 30 move relative to each other. The stiffening ring 80 may be formed from an outer ring 82 and an inner ring 84, as illustrated in FIGS. 6 and 7. Although shown as a cylindrical ring defining passages 86 (FIG. 7), in some embodiments, the stiffening ring 80 may include a second profile formed from projections and recesses (shown in FIGS. 8 and 9) that substantially match the first profile of the flexible body 50.

During assembly, the seal body 40 is formed by overmolding the flexible body 50 on the stiffening ring 80. The seal body 40 is then installed onto the sleeve shaft 30 with the mounting surface 52. More specifically, the seal body 40 is installed on the sleeve shaft 30 so that the projections 56 and recesses 58 are aligned with projections and recesses in the elongated recess 32 of the sleeve shaft 30. The seal body 40 may be retained on the sleeve shaft 30 by a variety of techniques such as crimping, adhesive, or any other known method. The spline shaft 20 is then disposed into the elongated recesses 32 so that the projections 56 on the flexible body 50 fit within the grooves 22 and the recesses 58 on the flexible body 50 receive the ribs 24. Once installed on the sleeve shaft 30, the flexible body 50 is configured for movement relative to the spline shaft 20.

Figure 8:
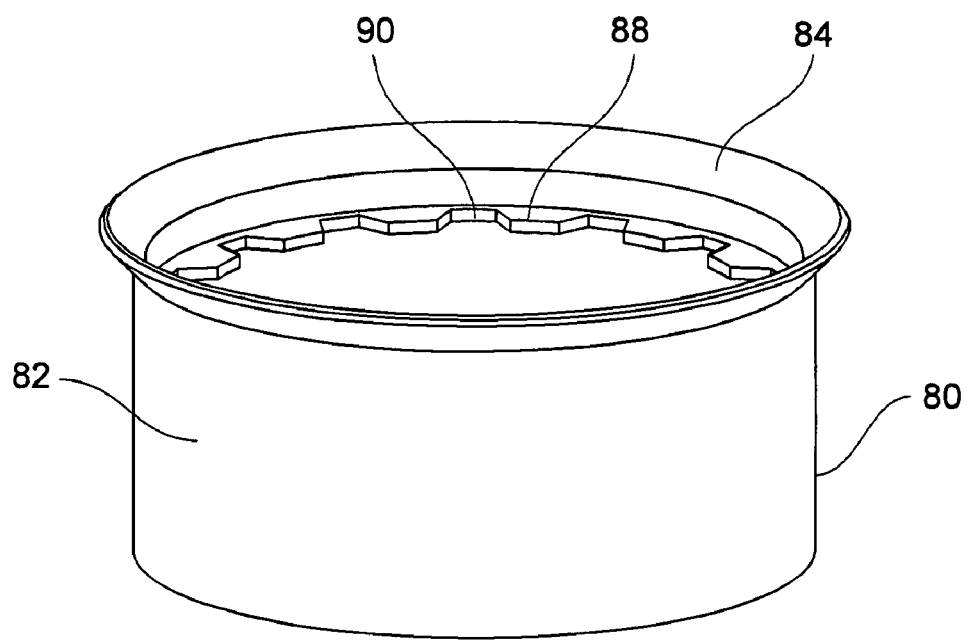
FIG. 8 is a perspective view of a stiffening ring with projections and recesses.
Figure 9:
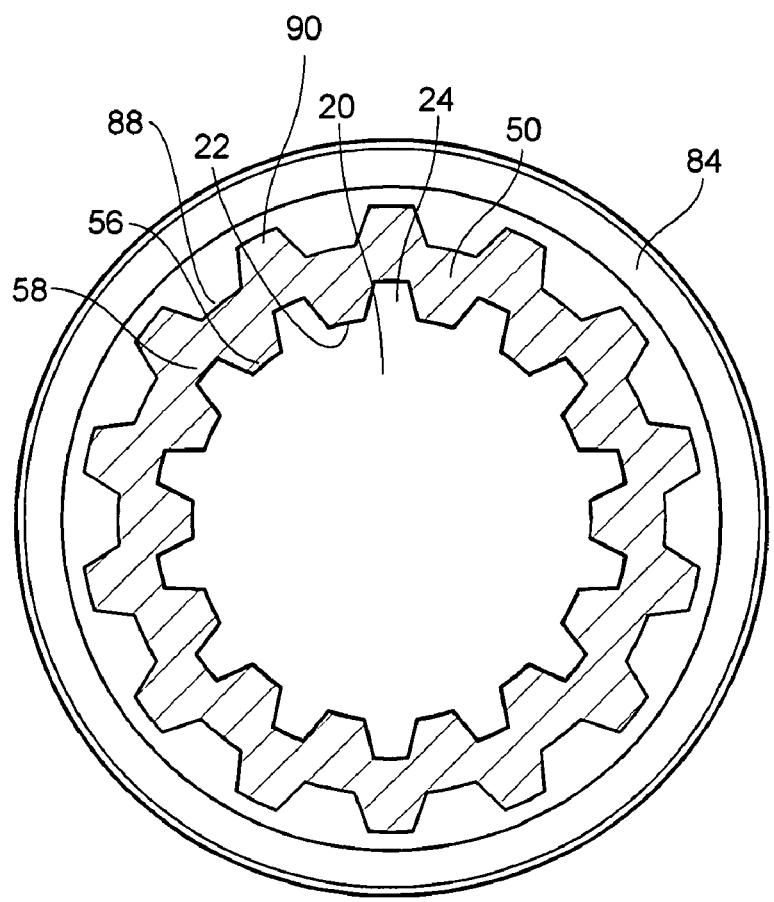
FIG. 9 is a plan view of the stiffening ring with projections and recesses.

FIGS. 8 and 9 illustrate the stiffening ring 80 including a profile formed from projections and recesses that substantially match the first profile of the flexible body 50. The inner ring 84 includes alternating projections 88 and recesses 90 formed therein. The flexible body 50 is overmolded over the alternating projections 88 and recesses 90. The profile of the alternating projections 88 and recesses 90 formed in the stiffening ring 80 matches the profile of the alternating projections 56 and recesses 58 of the flexible body 80 that mates with the spline shaft 20. Alternatively, the outer ring 82 may also include alternating projections and recesses matching the profile of the alternating projections and recesses of the flexible body 50.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A seal body comprising:
   a flexible body having an axis and rows of alternating projections and recesses aligned with said axis;
   a wiper element on at least one of said rows of alternating projections and recesses, said wiper element including a tapered surface and an engagement face, said engagement face being substantially parallel to said axis and adjoining said tapered surface;
   wherein said flexible body includes a base portion, and wherein said tapered surface is a bevel adjoining the engagement face that extends from said engagement face axially and radially toward said base portion.

2. The seal body of claim 1 wherein said engagement face includes a textured surface having small lateral ribs.

3. The seal body of claim 1 wherein said engagement face includes a beaded lip.

4. The seal body of claim 1 further including a stiffening ring having an outer ring and an inner ring, and wherein said flexible body is overmolded on said stiffening ring.

5. The seal body of claim 4 wherein said stiffening ring includes a profile of rows of alternating projections and recesses, and wherein said flexible body further includes a second profile of rows of alternating projections and recesses that mate with said profile of rows of alternating projections and recesses on said stiffening ring.

6. The seal body of claim 1 wherein said flexible body further includes a mounting surface.

7. The seal body of claim 6 wherein said mounting surface defines an inner diameter, said projections extending toward said axis to define a projection diameter less than said inner diameter.

8. The seal body of claim 1 wherein said engagement face includes a textured surface having a scored surface.

9. A slip spline seal assembly comprising:
a spline shaft having rows of alternating longitudinal grooves and ribs;
a seal body engaging said spline shaft and including a flexible body having rows of alternating projections and recesses for sealing engagement with said grooves and ribs of said spline shaft; and
a wiper element on at least one of said alternating projections and recesses of said seal body, said wiper element including a tapered surface and an engagement face, said engagement face adjoining said tapered surface and engaging one of said rows of alternating grooves and ribs;
wherein said flexible body includes a base portion, and wherein said tapered surface is a bevel that extends from said engagement face axially and radially toward said base portion.

10. The slip spline seal assembly of claim 9 wherein said engagement face includes a textured surface having small lateral ribs.

11. The slip spline seal assembly of claim 9 further including a sleeve shaft configured to move longitudinally relative to said spline shaft and wherein said seal body includes a mounting surface engaging said sleeve shaft when said seal body is coupled to said sleeve shaft, said seal body configured to move with said sleeve shaft and relative to said spline shaft.

12. The slip spline seal assembly of claim 9 wherein said seal body further includes a stiffening ring formed from an outer ring and an inner ring and said flexible body is overmolded on said stiffening ring.

13. The slip spline seal assembly of claim 12 wherein said stiffening ring includes a profile of rows of alternating projections and recesses, and wherein said flexible body further includes a second profile of rows of alternating projections and recesses that mate with said profile of rows of alternating projections and recesses on said stiffening ring.

14. The slip spline seal assembly of claim 9 wherein said engagement face includes a textured surface having small lateral ribs.

15. The slip spline seal assembly of claim 9 wherein said engagement face includes a textured surface having a scored surface.

16. The slip spline seal assembly of claim 9 wherein said engagement surface includes a beaded lip.

17. A spline seal assembly comprising:
a stiffening ring; and
a flexible body having an axis and being overmolded on said stiffening ring, said flexible body including an inner surface having a first profile of projections and alternating recesses;
wherein said stiffening ring includes an inner ring and an outer ring extending toward said axis, said inner ring defining support passages for coupling said flexible body to said stiffening ring.

* * * * *